United States Patent Office 2,965,645

Patented Dec. 20, 1960

2,965,645

STABILIZATION OF CERTAIN VINYL PYRIDINES AND COMPOSITIONS

Stanley D. Turk and Mack F. Potts, Bartlesville, Okla., assignors to Phillips Petroleum Company, a corporation of Delaware No Drawing. Filed Sept. 1, 1955, Ser. No. 532,106

9 Claims. (Cl. 260—290)

This invention relates to a process for inhibiting polymerization of polymerizable heterocyclic compounds containing a hetero nitrogen atom. In one of its aspects, this invention relates to the inhibiting of polymerization of alkenyl-substituted heterocyclic nitrogen-containing compounds. In still another aspect, this invention relates to the inhibiting of the formation of polymer in vinylpyridine compounds.

The words inhibit and stabilize as used in this specification and the attached claims are used to mean that the formation of polymer is materially reduced or prevented, and do not imply any mechanism for accomplishing this purpose.

Alkenyl-substituted heterocyclic nitrogen-containing compounds are frequently produced by dehydrogenation of the corresponding alkyl-substituted compound. The dehydrogenation is not complete and the resulting mixture is separated into its component parts, chiefly alkyl and alkenyl-substituted nitrogen-containing heterocyclic ring compounds, by suitable means such as distillation. However, the tendency of the alkenyl-substituted compound to polymerize is a major difficulty encountered in the manufacture and storage of these compounds. As this tendency is enhanced by elevated temperature, the separation of the alkenyl-substituted compound from other constitutents by distillation is extremely difficult, due to the formation of polymer within the distillation column and auxiliary equipment.

In the processing of alkenyl-substituted heterocyclic nitrogen-containing compounds, polymerization occurs which manifests itself in two ways. Soluble polymers are formed which are evidenced by an increase in viscosity, and ultimately, by forming a solid mass. Also formed are insoluble polymers or proliferous polymers referred to in the trade, and herein, as popcorn polymers. The popcorn polymer is insoluble in the heterocyclic nitrogen compound and in other organic compounds, and when in contact with a monomer, it continues to grow. This problem is particularly acute in the manufacture, processing and storing of vinyl-substituted pyridines obtained by the dehydrogenation of the corresponding ethyl-substituted pyridines. The method generally used to avoid the formation of these polymers is to add a stabilizing agent or polymerization inhibitor. However, one difficulty encountered in the process of adding a stabilizing agent to these alkenyl-substituted heterocyclic nitrogen-containing compounds is that the inhibitor which is effective in preventing the formation of soluble polymer is frequently only partially effective in preventing the formation of popcorn polymer, or the reverse can be true. Also, an inhibitor at one temperature is not necessarily useful at another temperature.

An object of this invention is to provide a method of stabilizing alkenyl-substituted heterocyclic nitrogen-containing compounds against polymerization.

Another object of this invention is to provide an alkenyl-substituted heterocyclic nitrogen-containing compound stabilized against polymerization.

Still another object of this invention is to provide a novel polymerization inhibitor effective against both soluble and popcorn polymer formation in alkenyl-substituted heterocyclic nitrogen-containing compounds.

Still another object of this invention is to provide a polymerization inhibitor especially useful in a distillation column wherein alkenyl-substituted heterocyclic nitrogen-containing monomers are being separated from other compounds.

Still other objects and advantages of this invention will be apparent to those skilled in the art having been given this disclosure.

It has now been discovered that the nitrosophenols and their tautomeric quinone oximes of the following general formulae are effective in inhibiting the polymerization of vinylpyridines and other polymerizable heterocyclic nitrogen compounds at ambient temperatures, and at conditions of elevated temperatures, i.e., processing and storage conditions.

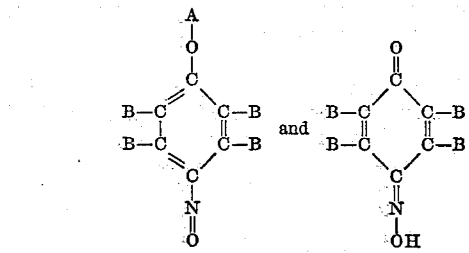

In the above general formula A is selected from the group of hydrogen and alkali metals, e.g. sodium, potassium, lithium, rubidium and cesium; and B is selected from the group consisting of hydrogen and an alkyl group containing up to 8 carbon atoms and the total carbon atoms in all such groups should not exceed 8.

While all of the compounds of the above general formula are effective in inhibiting the polymerization of polymerizable heterocyclic nitrogen containing compounds, the preferred inhibitors of this invention are the compounds of the above general formula which are alkali metal salts of the above defined nitrosophenols, such salts being effective at lower concentrations than are the nitrosophenols per se.

According to this invention, polymerizable heterocyclic nitrogen containing compounds are stabilized against polymerization by the addition of a nitrosophenol of the type described.

In general, the amount of inhibitor used will be in the range of 0.01 weight percent to 5 weight percent based on the polymerizable compound with an amount in the range of 0.05 to 2 weight percent being most frequently used. It will be understood by those skilled in the art that lesser amounts can be used but may not provide adequate protection while greater amounts are not ordinarily required.

Examples of the compounds of the above general formula includes: 4-nitrosophenol; sodium salt of 4-nitrosophenol; 2-methyl-4-nitrosophenol; potassium salt of 2-methyl-4-nitrosophenol; 2-methyl-5-isopropyl-4-nitrosophenol; lithium salt of 2-methyl-5-isopropyl-4-nitrosophenol; 3-ethyl-4-nitrosophenol; 3-ethyl-6-t-butyl-4-nitrosophenol; 3-isooctyl-4-nitrosophenol; cesium salt of 3-n-octyl-4-nitrosophenol; rubidium salt of 2,3,5,6-tetraethyl-4-nitrosophenol, and similar alkyl substituted 4-nitrosophenols and alkali metal salts thereof, quinone oxime and similarly alkyl substituted quinone oxime.

Both the soluble and popcorn polymer formation are inhibited by the compounds of this invention. These inhibitors are particularly useful in distillation processes since the material is effective both in the pot and in the column, however, these inhibitors are also effective as storage inhibitors.

One group of polymerizable heterocyclic nitrogen compounds which are inhibited in accordance with our invention comprises the vinylpyridines with the vinyl group being present in any of the several positions in the pyridine ring. Alkyl groups can be present on the ring or on the alpha carbon atoms of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, aryl, vinyl, and isopropenyl (alpha-methylvinyl) groups, at least one of said groups being vinyl or alpha-methylvinyl; and the total number of carbon atoms in the alkyl groups being not greater than 12. Examples of such compounds include 2-vinylpyridine; 3-vinylpyridine; 4-vinylpyridine; 2,3,4-trimethyl-5-vinylpyridine; 3,4,5,6-tetramethyl-2-vinylpyridine; 2-methyl-5-vinylpyridine; 3-ethyl-5-vinylpyridine; 2,6-diethyl-4-vinylpyridine; 2-isopropyl-4-nonyl-5-vinylpyridine; 2-methyl-5-undecyl-6-vinylpyridine; 3-dodecyl-4-vinylpyridine; 2,4-dimethyl-5,6-diphenyl-3-vinylpyridine; 3-(alpha-methylvinyl)pyridine; and similar substituted alkene and alkadiene pyridines.

Other polymerizable heterocyclic compounds containing a hetero nitrogen atom stabilized by the method of this invention are those vinyl and alpha-methylvinyl substituted heterocyclic nitrogen compounds in which the ring structure is unsaturated, partially saturated, and completely saturated. That is, such compounds as alkene, alkadiene and alkyne substituted pyridines, quinolines, isoquinolines, piperidines, pyrroles, pyrrolidines, pyrrolidones, alkyl derivatives of the foregoing compounds, dihydro and tetrahydropyridines, partially hydrogenated quinolines, isoquinolines, and pyrrolines (dihydropyrroles). Of special importance are the vinyl and alphamethylvinyl substituted derivatives of these heterocyclic nitrogen containing compounds, examples of which are 2-vinylquinoline; 8-ethyl-2-vinylquinoline; 4-hexyl-5-vinylquinoline; 1-vinylisoquinoline; 5-methyl-1-isopropenylisoquinoline; vinylpyrrolidone; vinylpyrrole; vinylpiperidine; vinylpyrrolidine and the like. Normally the alkene, alkadiene or alkyne substituents will be attached to a ring carbon atom. However, in compounds wherein the ring nitrogen atom is a secondary nitrogen atom, the vinyl group can be attached to this ring nitrogen atom. For example, N-vinylcarbazole and N-vinylpyrrolidone. The inhibitors of this invention are particularly applicable to separation by distillation or organic mixtures containing a substantial proportion of vinylpyridine compound. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, 5-aryl-2-vinylpyridine, and the like.

The heterocyclic compound containing a hetero nitrogen atom of particular commercial importance is 2-methyl-5-vinylpyridine (MVP). The sodium salt of the 4-nitrosophenol is readily prepared and sodium compounds are readily available for preparing such compositions. For that reason, I will illustrate how my invention is useful for inhibiting polymer formations in 2-methyl-5-vinylpyridine monomers using the nitrosophenol and the sodium salt thereof. It will be understood by those skilled in the art that the heterocyclic nitrogen containing compounds as disclosed can be similarly inhibited against polymerization by these or the other nitrosophenols disclosed.

EXAMPLE I

Several of the nitrosophenol inhibitors of this invention were tested for their effectiveness as inhibitors of soluble polymer formation in 2-methyl-5-vinylpyridine (MVP) by the following procedure:

Samples of MVP containing 5 weight per cent water were placed in vials and to each vial was added a small piece of steel and the inhibitor to be tested. The vials were then flushed with nitrogen and sealed tightly with screw-on tops. The vials were then placed in an oven and maintained at 185° F. for 16 hours, after which a weighed sample of the contents of each vial was evaporated under vacuum and over boiling water. The residue which remained, with allowance for the weight of inhibitor present, was considered to be soluble polymer. The results of these tests are expressed below as Table I.

*Table I*

| Inhibitor | Amount of Inhibitor Used, Wt. Percent, Based on MVP | Amount of Soluble Polymer Formed (Weight percent), Avg. at Two Runs |
|---|---|---|
| 4-nitrosophenol (sodium salt) | 0.1 | 0.76 |
| | 0.3 | 0.46 |
| | 0.6 | 0.42 |
| 4-nitrosophenol | 0.1 | 3.74 |
| | 0.3 | 0.54 |
| | 0.6 | 0.64 |
| Control | (1) | 25 |

[1] No inhibitor.

EXAMPLE II

A group of tests were made using the nitrosophenol compounds of this invention to determine their effectiveness as inhibitors toward the formation of insoluble or "popcorn" polymer in 2-methyl-5-vinylpyridine. Samples of flashed MVP containing 5% water, 0.3 weight percent divinylbenzene and the stated amount of the inhibitor to be tested were placed in #1 screw-capped glass vials in such a manner as to leave 35% of the vial empty. These vials were then placed in an oven and maintained at 185° F. for various periods of time. The results of these tests are expressed below as Table II.

*Table II*

| Inhibitor | Amount of Inhibitor Used, Wt. percent | Results |
|---|---|---|
| 4-nitrosophenol (sodium salt). | 0.05 | No growth in the monomer in 34 days. |
| | 0.10 | Do. |
| | 0.30 | Do. |
| | 0.60 | Do. |
| 4-nitrosophenol | 0.10 | No polymer in monomer in 3 days—approximately 10% polymer in monomer in 17 days. |
| Control | (1) | Growth started in 5 hours. 100% polymer in 8 hours. |

[1] No inhibitor.

EXAMPLE III 4-nitrosophenol (sodium salt) of this invention was tested to determine its effectiveness as a polymerization inhibitor for MVP under conditions of storage and/or transit.

Flashed MVP to which had been added 0.1% by weight 4-nitrosophenol (sodium salt) was charged to a #1 screw-capped vial. Thirty-five percent of the volume of the vial was left empty to simulate storage conditions. A one-inch long piece of 1/16 inch diameter steel wire was placed in the vial, a tin foil lid was placed on the vial, and the cap was sealed on with sealing wax. The vial was then stored at 100° F. and at the end of the test period, the amount of soluble polymer in the vial was determined by precipitating out the polymer in normal hexane, filtering the polymer, drying and weighing. There was no soluble polymer formed during a period of 26 days at which time the test was discontinued. A similar run in which no inhibitor was added was analyzed by the above-described precipitation method, and 22.25% by weight soluble polymer was found to have been formed during a period of 21 days.

EXAMPLE IV

Since the nitrosophenols are classified as dye compounds, a flash distillation was run to see if the overhead (MVP) from this flash distillation would be colored when 4-nitrosophenol (sodium salt) was employed as the polymerization inhibitor.

Five hundred twenty-one grams of flashed MVP containing 5% water and 1% 4-nitrosophenol (sodium salt) by weight was charged to a Vigreaux distillation column approximately 6 inches high by ¾ inch diameter. The MVP was distilled overhead from this column under an absolute pressure of 10 mm. of mercury. The overhead from this column had a color of 1 or less as measured by the Gardner scale except for the last 8 cc. which had a Gardner color of 6.

EXAMPLE V

A steam distillation run was carried out to see if sodium salt of 4-nitrosophenol would adversely affect the MVP overhead by coloring this organic phase. Two runs were made in this manner, one using an inhibitor concentration of approximately 2% by weight based on the MVP monomer present and the other using an inhibitor concentration of 0.6% by weight on the same basis. The Vigreaux column of Example IV was also used in these runs. In each run, 261 grams of flashed MVP containing the inhibitor and a small amount of water (13 grams) was charged to the kettle of the column. This is equivalent to approximately 270 cc. of charge. This charge was then steam distilled past the point where all of the organic phase had been distilled overhead and only a single phase was being obtained as an overhead product. This distillation was conducted at atmospheric pressure.

In the run in which the inhibitor was used at a 0.6% concentration, no colored product came overhead during the steam distillation. Both the organic phase and the aqueous phase had a color of less than 1 as measured by the Gardner scale.

In the run in which the inhibitor was used at a concentration of 2%, all of the organic phase had a Gardner color of less than 1 with the exception of the last 20 cc. which did develop a Gardner color of 3. As soon as all of the organic phase was completely overhead and only the single aqueous phase was being distilled overhead, this overhead product was again noted to have a Gardner color of less than 1.

We claim:

1. A composition of matter comprising a heterocyclic nitrogen-containing compound selected from the group consisting of vinyl and alphamethylvinylpyridines and alkyl substituents thereof wherein the total carbon atoms in such alkyl substituents do not exceed 12, said heterocyclic nitrogen containing compound having incorporated therein a stabilizing amount up to 0.1 weight percent of a compound for the formula

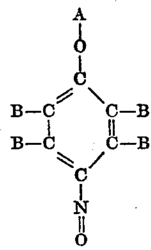

wherein A is an alkali metal and wherein B is selected from the group consisting of hydrogen and alkyl groups of 1 to 8 carbon atoms and where the total number of all carbon atoms in said B groups does not exceed 8.

2. A composition of matter comprising a heterocyclic nitrogen-containing compound selected from the group consisting of vinyl and alphamethylvinylpyridines and alkyl substituents thereof wherein the total carbon atoms in such alkyl substituents do not exceed 12, said heterocyclic nitrogen-containing compound having incorporated therein a stabilizing amount up to 0.1 weight percent of the sodium salt of a compound of the formula

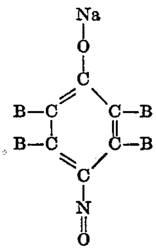

wherein B is selected from the group consisting of hydrogen and alkyl groups of 1 to 8 carbon atoms and where the total number of all carbon atoms in said B groups does not exceed 8.

3. A composition of matter comprising a heterocyclic nitrogen-containing compound selected from the group consisting of vinyl and alphamethylvinylpyridines and alkyl substituents thereof wherein the total carbon atoms in such alkyl substituents do not exceed 12, said heterocyclic nitrogen-containing compound having incorporated therein a stabilizing amount up to 0.1 weight percent of the sodium salt of a nitrosophenol.

4. A composition of matter comprising a heterocyclic nitrogen-containing compound selected from the group consisting of vinyl and alphamethylvinylpyridines and alkyl substituents thereof wherein the total carbon atoms in such alkyl substituents do not exceed 12, said heterocyclic nitrogen-containing compound having incorporated therein a stabilizing amount up to 0.1 weight percent of the sodium salt of 4-nitrosophenol.

5. A composition of matter comprising 2-methyl-5-vinylpyridine having incorporated therein a stabilizing amount up to 0.1 weight percent of the sodium salt of 4-nitrosophenol.

6. A process for inhibiting the formation of polymer in a distillation zone in which a mixture comprised of vinyl substituted heterocyclic nitrogen compounds selected from the group consisting of vinyl and alphamethylvinylpyridine and alkyl substituents thereof wherein the total carbon atoms in such alkyl substituents does not exceed 12 and other heterocyclic nitrogen compounds is being distilled, said process comprising introducing into the feed of said distillation zone from 0.05 percent to 2 percent by weight, based on the weight of the vinyl substituted heterocyclic compound in said feed, sodium salt of 4-nitrosophenol.

7. A process for inhibiting the formation of polymer in a distillation zone in which a mixture comprised of vinyl substituted heterocyclic nitrogen compounds selected from the group consisting of vinyl and alphamethylvinylpyridine and alkyl substituents thereof wherein the total carbon atoms in such alkyl substituents does not exceed 12 and other heterocyclic nitrogen compounds is being distilled, said process comprising introducing into the feed of said distillation zone from 0.05 percent to 2 percent by weight, based on the weight of the vinyl substituted heterocyclic compound in said feed, potassium salt of 2-methyl-4-nitrosophenol.

8. A process for inhibiting the formation of polymer in a distillation zone in which a mixture comprised of vinyl substituted heterocyclic nitrogen compounds selected from the group consisting of vinyl and alphamethylvinylpyridine and alkyl substituents thereof wherein the total carbon atoms in such alkyl substituents does not exceed 12 and other heterocyclic nitrogen compounds is being distilled, said process comprising introducing into the feed of said distillation zone from 0.05 percent to 2 percent by weight, based on the weight of the vinyl substituted heterocyclic compound in said feed, sodium salt of 2,3,5,6-tetraethyl-4-nitrosophenol.

9. A process for inhibiting polymer formation in a mixture of organic compounds comprising 2-methyl-5-vinylpyridine and 2-methyl-5-ethyl-pyridine, said process comprising adding to said mixture from 0.01 to 5 weight percent based on the weight of said 2-methyl-5-vinylpyridine of sodium salt of 4-nitrosophenol.

References Cited in the file of this patent

Dunbrook et al.: 644 O.G. 623–4.

Frank et al.: J. Am. Chem. Soc., vol. 68, p. 908 (1946).